Jan. 2, 1934.  O. WITTEL  1,941,523
FILM REEL AND SUPPORT THEREFOR
Filed Aug. 2, 1930  2 Sheets-Sheet 2
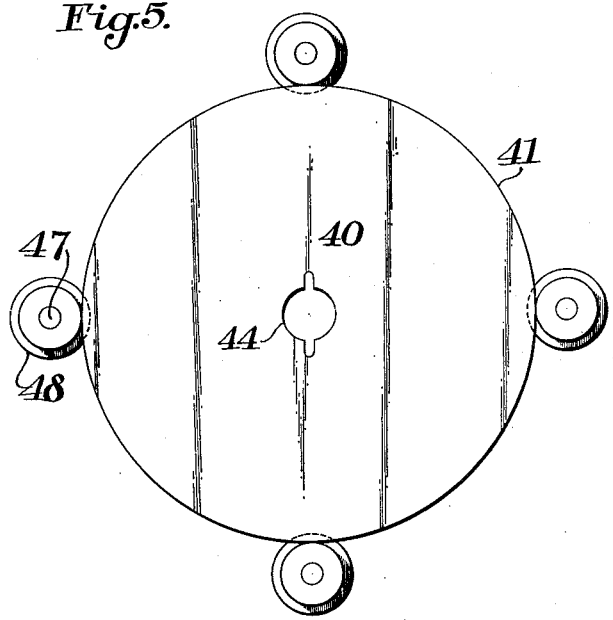
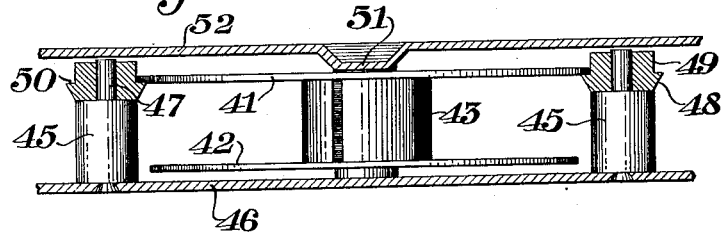
Otto Wittel,
Inventor;
By Newton M. Perrins
Attorneys Patented Jan. 2, 1934

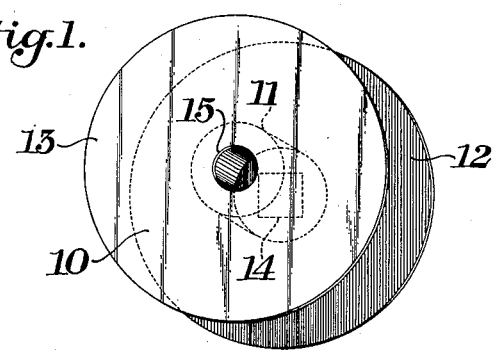
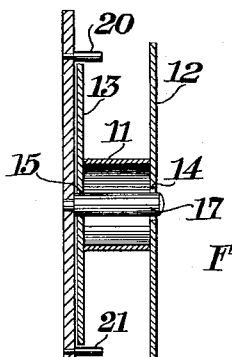
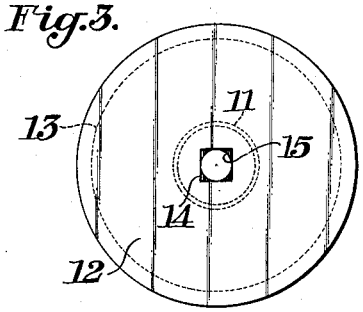
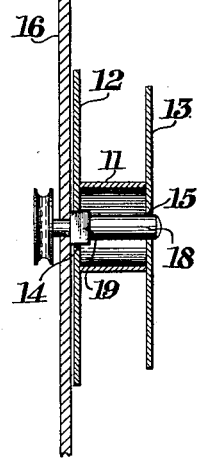

1,941,523

UNITED STATES PATENT OFFICE 1,941,523

FILM REEL AND SUPPORT THEREFOR

Otto Wittel, Rochester, N. Y., assignor to Eastman Kodak Company, Rochester, N. Y., a corporation of New York Application August 2, 1930. Serial No. 472,679

9 Claims. (Cl. 242—71)

My invention relates to reel and spindle mounts for use in motion picture apparatus, and particularly to simple and effective means whereby the reels may be interchanged and will necessarily be correctly positioned.

Reel mountings have frequently been provided with a special spindle for the take-up reel to prevent reverse mounting of the reels on this spindle, but providing no means for preventing reverse mounting of the supply reel on the stationary spindle.

It is an object of my invention to provide an effective means for preventing reverse mounting of the reels on either spindle.

My invention has particular application to apparatus for exposing and projecting two longitudinal series of pictures on a single film which requires both the supply reel and the take-up reel to be mounted in a definite way. Heretofore, memory alone has been depended upon to determine the correct position for placing the filled take-up reel upon the stationary spindle and it frequently happened that the same half of the film was passed through the working area a second time, which in cameras completely spoiled that half of the film and in projection apparatus caused considerable annoyance and trouble.

It is an object of my invention to prevent all such misfortunes due to thoughtlessness or lapse of memory by making it impossible to place the filled take-up reel upon the stationary spindle in other than the correct position.

These and other objects and advantages of my invention will appear from the following description with reference to the accompanying drawings in which:

Fig. 1 is a perspective view of my improved reel;

Fig. 2 is a sectional view of a support provided with spindles having reels mounted thereon;

Figs. 3 and 4 are partial views of opposite sides of the reels, and

Figs. 5 and 6 illustrate a modification of my invention.

Like reference numerals indicate like parts in the several views.

Numeral 10 designates a reel made in accordance with my invention provided with the hub 11 to which is attached circular flanges 12 and 13 provided with coaxial spindle apertures 14 and 15 respectively. The diameter of flange 12 is greater than the diameter of flange 13, the purpose of which will hereinafter appear.

As shown, the aperture 14 is square and the aperture 15 is circular, the length of the sides of the square aperture 14 being the same as the diameter of the round aperture 15 (see Figures 3 and 4) and equal to the diameters of the cylindrical spindles 17 and 18.

The member 16, which ordinarily will be a portion of the motion picture apparatus forms the support for the stationary spindle 17 and the driven spindle 18 having a square base 19 of the same dimensions as the square aperture 14. Two pins, 20 and 21, forming obstructions, are mounted on the member 16 at a distance from the spindle 17 greater than the radius of the small flange 13 and less than the radius of the large flange 12.

The supply reel is mounted on and removed from the spindle 17 over the outer end thereof, and by reason of the fact that the radius of the flange 12 is greater than the distance between the spindle 17 and the pins 20 and 21, the reel can only be mounted on the spindle 17 in one way, that is, with the small flange 13 inward as shown.

The take-up reel is mounted on and removed from the driven spindle 18 over the outer end thereof, and by reason of the fact that the circular aperture 15 in the flange 13 will not fit over the square base 19 in the driven spindle 18, the reel can only be mounted on the spindle 18 in one way, that is, the flange 12, having the square aperture 14, inward as shown.

When reels are mounted on both spindles, a suitable casing or cover, not shown, is utilized to retain the reels in place in some well known manner.

From the above it is obvious that the reels may be interchanged, but necessarily must be correctly positioned when the casing is closed.

The obstructions cooperating with the stationary spindle have been shown as small pins, but it is obvious that any other suitable obstruction which will serve to provide a limited space may be used such as, for example, placing the spindle in a cylindrical depression formed in the support member. In the modification shown in Figures 5 and 6 the reel 40 includes spaced differential flanges 41 and 42 secured in a usual manner to opposite ends of the hub 43, the flange 41 being of greater diameter than the flange 42 and may be provided with a suitable aperture 44.

The reel support comprises a plurality of studs 45 mounted in spaced relation on a base plate 46 which will ordinarily be a suitable portion of the apparatus, and provided at the outer ends with reduced portions 47 upon which are mounted the rollers 48 having bearing surfaces 49 and outwardly facing shoulders 50 adapted to co-act with the edge of the flange 41 to rotatably support the reel 40. The spacing of the studs 45 is such that the smaller flange 42 is permitted to pass freely between the rollers 48. When the reel is mounted in its support the edge of the flange 41 is in bearing relation with the bearing surfaces 49 and the inner surface of the flange 41 engages with the outwardly facing shoulders 50 to limit inward movement of the reel and the lug 51 on the cover plate 52 by limiting outward movement of the reel cooperates to retain the reel in proper position. It is to be noted that in mounting the reel in its support that by reason of the fact that the larger flange 41 will not pass between the rollers 48, the reel can only be mounted in one way, and that is, with the smaller flange 42 inward as shown.

While I have illustrated a specific form and one modification which my invention may take in order more clearly to describe it, it is to be understood that my invention is not restricted to the details set forth since these may be modified within the scope of the appended claims without departing from the spirit and scope of my invention.

What I claim as new and desire to secure by Letters Patent of the United States is:

1. A reel support adapted for the removable mounting thereon of a reel having two axially spaced flanges of different diameters and provided with a spindle and positioning means, said positioning means comprising an obstructing member spaced from the spindle by a distance greater than one-half the diameter of one of the flanges and less than one-half of the diameter of the other of the flanges.

2. In a device of the character described, a reel provided with two circular flanges of different radii and a spindle opening, a spindle and pin in spaced relation on a support, the distance between said spindle and pin being greater than the radius of one of said flanges and less than the radius of the other of said flanges.

3. A motion picture film reel or the like including two axially spaced flanges of different diameters adapted for removable mounting on a support member and means cooperating with the outer rim of the larger flange to prevent reverse mounting of the reel on the support member.

4. A film reel support adapted for the removable mounting of a reel thereon including a plurality of reel mount rollers provided with shoulders adapted to cooperate with one flange of a reel having differential flanges to prevent reverse mounting of the reel on the support.

5. A device of the character described including a plurality of reel mount rollers adapted for the removable mounting of a reel thereon, each of said rollers comprising an outer cylindrical portion and an inner portion forming an outwardly facing shoulder, a reel having differential flanges, one of said flanges being of a size to pass between said shoulders and the other of said flanges being of a size to engage with said shoulders and to have a bearing engagement with the cylindrical portions of said rollers and means for holding the last mentioned flange in contact with said shoulders.

6. A device of the character described including a plurality of rollers adapted for the removable mounting of a reel therebetween and provided with outwardly facing shoulders, a reel having a flange engageable with said shoulders and removable means for maintaining said flange against said shoulders.

7. A device of the character described including a film reel provided with a circular flange, a base, a plurality of rollers mounted on said base and spaced tangentially about the circumference of a circle having a diameter equal to the diameter of said flange, said rollers being adapted to support said flange, shoulders on said rollers for limiting axial movement of the reel in one direction, and removable means for limiting axial movement of the reel in the other direction.

8. A film reel support for motion picture apparatus adapted to receive a reel having flanges of different diameter, including a base plate, a plurality of rotatable posts carried thereby, shoulders on the rotatable posts for engaging the reel flange of greater diameter, a cover spaced from the base plate and a projection on said cover for limiting axial movement of the reel on the rotatable posts.

9. In a motion picture apparatus the combination of a reel support including spaced rollers with a reel, said reel including flanges of different sizes, a base plate, a plurality of supports for said rollers carried by the base plate, said supports being mounted in spaced relation to permit free movement of the smaller flange therebetween, said rollers being adapted to engage the larger flange, a cover plate normally spaced from the base plate, said cover plate having a protuberance thereon adapted to retain the larger flange in contact with the rollers when a reel is placed in the support by inserting the smaller flange between the posts.

OTTO WITTEL.